US012650274B2

(12) United States Patent
Richards et al.

(10) Patent No.: US 12,650,274 B2
(45) Date of Patent: Jun. 9, 2026

(54) HEAT EXCHANGER WITH ENHANCED HEAT TRANSFER MANIFOLD

(71) Applicant: Raytheon Technologies Corporation, Farmington, CT (US)

(72) Inventors: Joshua Richards, Manchester, CT (US); Tyler G. Vincent, Portland, CT (US)

(73) Assignee: RTX Corporation, Farmington, CT (US)

( * ) Notice: Subject to any disclaimer, the term of this patent is extended or adjusted under 35 U.S.C. 154(b) by 211 days.

(21) Appl. No.: 18/215,761

(22) Filed: Jun. 28, 2023

(65) Prior Publication Data

US 2025/0003704 A1    Jan. 2, 2025

(51) Int. Cl.
    *F28F 13/12*        (2006.01)
    *G01F 1/32*         (2022.01)

(52) U.S. Cl.
    CPC ............ *F28F 13/12* (2013.01); *G01F 1/3209* (2013.01)

(58) Field of Classification Search
    CPC ... F28F 13/12; F28F 9/028; F28D 2021/0026; G01F 1/3209
    See application file for complete search history.

(56) References Cited

U.S. PATENT DOCUMENTS 5,893,411 A * 4/1999 Nir ........................ F28D 7/0091
                                                165/140
10,024,175 B2   7/2018 Varney 10,941,079 B2    3/2021 Shim
2018/0106561 A1    4/2018 Diffey
2019/0390924 A1   12/2019 Anderson
2021/0198160 A1    7/2021 Shim

FOREIGN PATENT DOCUMENTS

| CN | 106767012 B | * | 9/2019 |
|----|----|----|----|
| EP | 1293742 A | | 3/2003 |
| EP | 4015976 A | | 6/2022 |
| KR | 20220020526 A | | 2/2022 |

OTHER PUBLICATIONS

EP Search Report for EP Patent Application No. 24185546.9 dated Oct. 10, 2024.

* cited by examiner

*Primary Examiner* — Harry E Arant
(74) *Attorney, Agent, or Firm* — Getz Balich LLC

(57) ABSTRACT

A heat exchanger is provided that includes a heat exchanger core, an inlet manifold, and a turbulence generating structure. The inlet manifold is in fluid communication with the heat exchanger core. The inlet manifold has a fluid inlet and outlet. The turbulence generating structure is disposed adjacent to the fluid inlet, and a separation distance from the fluid outlet. The heat exchanger is configured with a fluid flow path through which a fluid flow enters the heat exchanger through the fluid inlet, encounters the turbulence generating structure and passes through the fluid outlet, and into the heat exchanger core. The turbulence generating structure is configured to produce turbulence in the fluid flow. The separation distance is long enough such that the fluid flow entering the heat exchanger core is substantially free of the turbulence.

17 Claims, 3 Drawing Sheets

HEAT EXCHANGER WITH ENHANCED HEAT TRANSFER MANIFOLD

BACKGROUND OF THE INVENTION

1. Technical Field

This disclosure relates to turbine engines in general, and to turbine engine components configured for heat transfer via a fluid flow in particular.

2. Background Information

Heat exchangers are commonly used in aircraft applications to transfer heat between two fluids ("working fluids") for heating or cooling purposes. An inlet manifold is typically used on the hot fluid entrance or the cold fluid entrance to the heat exchanger in order to facilitate onboarding of the working fluid to the exchanger. To prevent leakage, the manifolds are typically rigidly attached to the heat exchanger core. During typical operation, it is not uncommon for the heat exchanger core temperature to differ from the inlet manifold temperature. As the difference between the temperatures of the working fluids becomes larger, the thermal difference between the heat exchanger core and the inlet manifold typically also increases. In applications where thermally driven stresses are life limiting it is desirable to minimize this thermal gradient. Furthermore, a heat exchanger core is typically designed to maximize heat transfer between working fluids of differing temperatures while manifolds are typically designed to minimize pressure loss. This functional difference creates a thermally fast responding heat exchanger core and an inlet manifold geometry that transfers thermal energy slower resulting in high internal stresses within the inlet manifold, or the heat exchanger core, or both. It would be desirable to provide a heat exchanger that avoids or mitigates internal stresses.

SUMMARY

According to an aspect of the present disclosure, a heat exchanger is provided that includes a heat exchanger core, an inlet manifold, and a turbulence generating structure. The inlet manifold is in fluid communication with the heat exchanger core. The inlet manifold has a fluid inlet and a fluid outlet. The turbulence generating structure is disposed adjacent to the fluid inlet of the inlet manifold, and a separation distance from the fluid outlet. The heat exchanger is configured with a fluid flow path through which a fluid flow enters the heat exchanger through the fluid inlet of the inlet manifold, encounters the turbulence generating structure and passes through the fluid outlet of the inlet manifold, and into the heat exchanger core. The turbulence generating structure is configured to produce turbulence in the fluid flow. The separation distance is long enough that the fluid flow entering the heat exchanger core is substantially free of the turbulence resulting from the turbulence generating structure.

In any of the aspects or embodiments described above and herein, the turbulence generating structure disposed adjacent to the fluid inlet of the inlet manifold may be a single structure.

In any of the aspects or embodiments described above and herein, the turbulence generating structure may have a circular cross-section having a diameter, and the separation distance may be in the range of fifteen to twenty-five times the diameter of the turbulence generating structure.

In any of the aspects or embodiments described above and herein, the separation distance may be about twenty times the diameter of the turbulence generating structure.

In any of the aspects or embodiments described above and herein, the turbulence generating structure may be a vortex generator configured to produce fluid vortices in the fluid flow aft of the turbulence generating structure, and the turbulence in the fluid flow includes the fluid vortices.

In any of the aspects or embodiments described above and herein, the turbulence generating structure configured to produce fluid vortices in the fluid flow aft of the vortex generator may be configured to form fluid vortices collectively as a Kárman vortex street.

In any of the aspects or embodiments described above and herein, the Kárman vortex street may have a length extending between the turbulence generating structure and the fluid outlet of the inlet manifold, and the length of the Kárman vortex street may be equal to or less than the separation distance.

In any of the aspects or embodiments described above and herein, the heat exchanger may further include an exit manifold, wherein the fluid flow path extends through the exit manifold.

In any of the aspects or embodiments described above and herein, the heat exchanger may be configured as a cross flow heat exchanger, wherein the fluid flow is a first fluid flow and the inlet manifold is a first inlet manifold, and the heat exchanger may be configured such the first fluid flow enters the heat exchanger through the fluid inlet of the first inlet manifold, encounters the turbulence generating structure and passes through the fluid outlet of the first inlet manifold and into the heat exchanger core, and the heat exchanger may have a second fluid path for a second fluid flow, and the second fluid path may be substantially orthogonal to the first fluid path.

According to an aspect of the present disclosure, a heat exchanger is provided that includes a heat exchanger core, a first inlet manifold, a first turbulence generating structure, and a second inlet manifold. The first inlet manifold is in fluid communication with the heat exchanger core, the first inlet manifold (FIM) having a FIM fluid inlet and a FIM fluid outlet. The first turbulence generating structure is disposed adjacent to the FIM fluid inlet of the first inlet manifold, and a first separation distance from the FIM fluid outlet. The second inlet manifold is in fluid communication with the heat exchanger core. The second inlet manifold (SIM) has a SIM fluid inlet and a SIM fluid outlet. The heat exchanger is configured with a first fluid flow path through which a first fluid flow enters the heat exchanger through the FIM fluid inlet, encounters the first turbulence generating structure and passes through the FIM fluid outlet, and into the heat exchanger core, wherein the first turbulence generating structure is configured to produce turbulence in the first fluid flow. The first separation distance is long enough such that the first fluid flow entering the heat exchanger core is substantially free of the turbulence resulting from the turbulence generating structure.

In any of the aspects or embodiments described above and herein, the heat exchanger may include a first exit manifold (FEM) having a FEM fluid inlet and a FEM fluid outlet, wherein the first fluid flow path extends through the first exit manifold, and the second turbulence generating structure may be a vortex generator configured to produce fluid vortices in the first fluid flow downstream of the second turbulence generating structure.

In any of the aspects or embodiments described above and herein, wherein the heat exchanger may further include a second turbulence generating structure disposed adjacent to the SIM fluid inlet and a second separation distance from the SIM fluid outlet, and the heat exchanger may be configured with a second fluid flow path through which a second fluid flow enters the heat exchanger through the SIM fluid inlet, encounters the second turbulence generating structure and passes through the SIM fluid outlet, and into the heat exchanger core, wherein the second turbulence generating structure may be configured to produce turbulence in the second fluid flow, and the second turbulence generating structure may be a vortex generator configured to produce fluid vortices in the second fluid flow downstream of the second turbulence generating structure.

In any of the aspects or embodiments described above and herein, the second turbulence generating structure may be configured to form fluid vortices collectively as a second Kármán vortex street.

In any of the aspects or embodiments described above and herein, the second Kármán vortex street may have a length extending between the second turbulence generating structure and the SIM fluid outlet, and the length of the second Kármán vortex street may be equal to or less than the second separation distance.

In any of the aspects or embodiments described above and herein, the heat exchanger may further include a second exit manifold (SEM) having a SEM fluid inlet and a SEM fluid outlet, and the second fluid flow path may extend through the second exit manifold.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
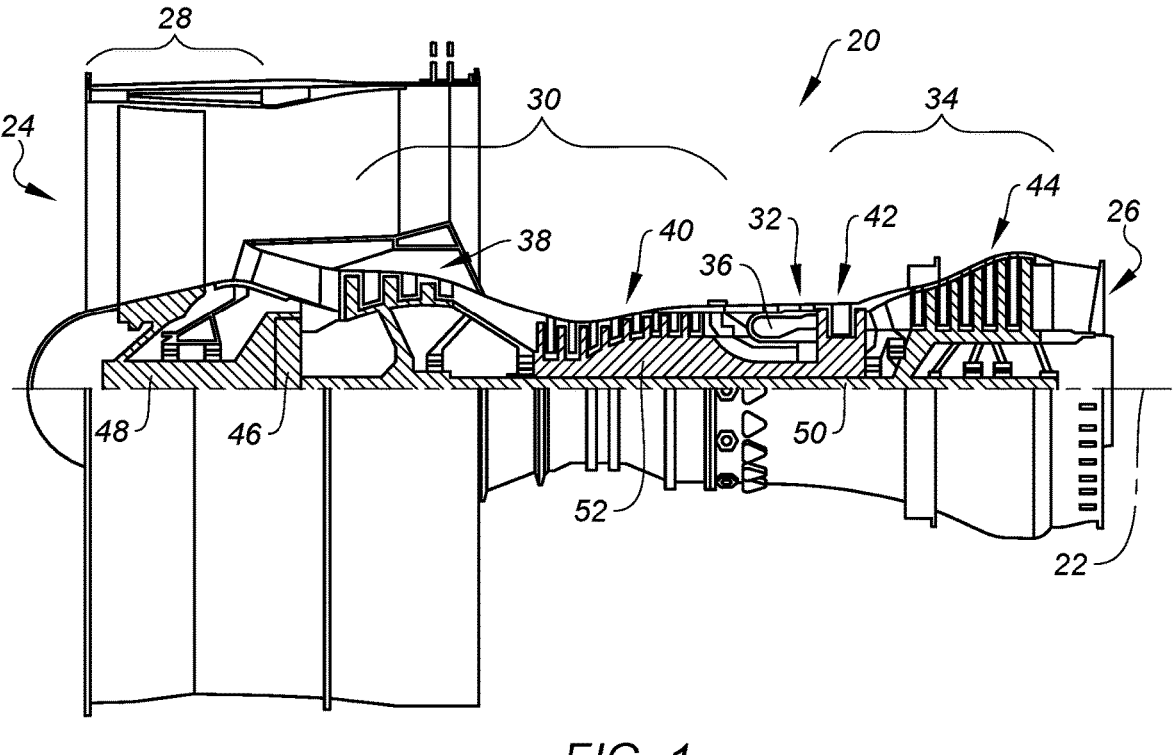
FIG. 1 is a diagrammatic sectional view of a gas turbine engine.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The combustor section 32 includes an annular combustor 36. The compressor section includes a low-pressure compressor (LPC) 38 and a high-pressure compressor (HPC) 40. The turbine section 34 includes a high-pressure turbine (HPT) 42 and a low-pressure turbine (LPT) 44. In the embodiment shown in FIG. 1, the engine sections are arranged sequentially along the centerline 22 within an engine housing. The fan section 28 is connected to a geared architecture 46, for example, through a fan shaft 48. The geared architecture 46 and the LPC 38 are connected to and driven by the LPT 44 through a low-speed shaft 50. The HPC 40 is connected to and driven by the HPT 42 through a high-speed shaft 52. The terms "forward", "leading", "aft, "trailing" are used herein to indicate the relative position of a component or surface. As air passes through the engine 20, a "leading edge" of a stator vane or rotor blade encounters the air before the "trailing edge" of the same. In a conventional axial engine such as that shown in FIG. 1, the fan section 28 is "forward" of the compressor section 30 and the turbine section 34 is "aft" of the compressor section 30. The terms "inner radial" and "outer radial" refer to relative radial positions from the engine centerline 22. An inner radial component or path is disposed radially closer to the engine centerline 22 than an outer radial component or path. The gas turbine engine diagrammatically shown in FIG. 1 is an example provided to facilitate the description herein. The present disclosure is not limited to any particular gas turbine engine configuration, including the two-spool engine configuration shown, and may be utilized with single spool gas turbine engines as well as three spool gas turbine engines and the like.

During operation, air enters the gas turbine engine 20 through the airflow inlet 24 and may be directed through the fan section 28 and into a core gas path. The gas traveling along the core gas path is directed through the engine sections 30, 32, 34 and exits the gas turbine engine 20 through the airflow exhaust 26 to provide forward engine thrust. Within the combustor section 32, fuel is injected into a combustor 36 and mixed with compressed air. This fuel-air mixture is ignited to power the gas turbine engine 20. The non-combusted air and combustion products produced in the combustor 36 pass to the turbine section 34 where they power the turbine section 34.

An aircraft propulsion system that includes a turbine engine often includes one or more heat exchangers and different heat exchangers may be utilized in different applications. Embodiments of the present disclosure include a heat exchanger having at least one fluid inlet manifold and a heat exchanger core, and may include at least one fluid exit manifold. The heat exchanger core may have a crossflow configuration for use with a first working fluid and a second working fluid, wherein the first and second working fluids are at different temperatures; e.g., the first working fluid is at a temperature higher than the second working fluid or vice versa. The present disclosure is not limited to a heat exchanger core in a crossflow configuration. In other embodiments, the present disclosure may be utilized in other structures wherein a working fluid (e.g., a hot fluid that is used to heat, or a cool fluid that is used to cool) is used to affect heat transfer with an engine component of the like. Examples of such components with which the present disclosure may be used include vane airfoils, blade airfoils, blade outer air seals (BOAS), and the like. To facilitate the description herein after, the term "heat exchanger" as used hereinafter is intended to include crossflow type heat exchangers as well as other components through which a working fluid is passed for purposes of heat transfer between the working fluid and the structure unless otherwise indicated. To be clear, the term "fluid" here is intended to include both gaseous fluids and liquid fluids.

In those embodiments wherein the heat exchanger core has a crossflow configuration for use with a first working fluid and a second working fluid, the first and second working fluids are at different temperatures; e.g., the first working fluid is at a temperature higher than the second working fluid or vice versa. The first and second fluid flows cross one another (e.g., fluid flow directions that are generally orthogonal to one another) but are maintained fluidly isolated from one another. At least one of the working fluids passing through the heat exchanger 54 (e.g., see FIG. 2) may follow a fluid path through an inlet manifold, a heat exchanger core, and an exit manifold; e.g., a first fluid (FF) path through an FF inlet manifold, an FF portion of the heat exchanger core, and an FF exit manifold. In some embodiments, each working fluid may follow a fluid path through a respective inlet manifold, heat exchanger core, and exit manifold; e.g., a first fluid (FF) path through an FF inlet manifold, an FF portion of the heat exchanger core, and an FF exit manifold, and a second fluid (SF) path through a SF inlet manifold, a SF portion of the heat exchanger core, and a SF exit manifold. To facilitate the description herein after, the present disclosure will be described as having a fluid path that passes through an inlet manifold, a heat exchanger core, and an exit manifold. The fluid flow path characteristics described hereinafter may be applicable to only the first or second fluid path, or to both the first and second fluid paths.

Figure 2:
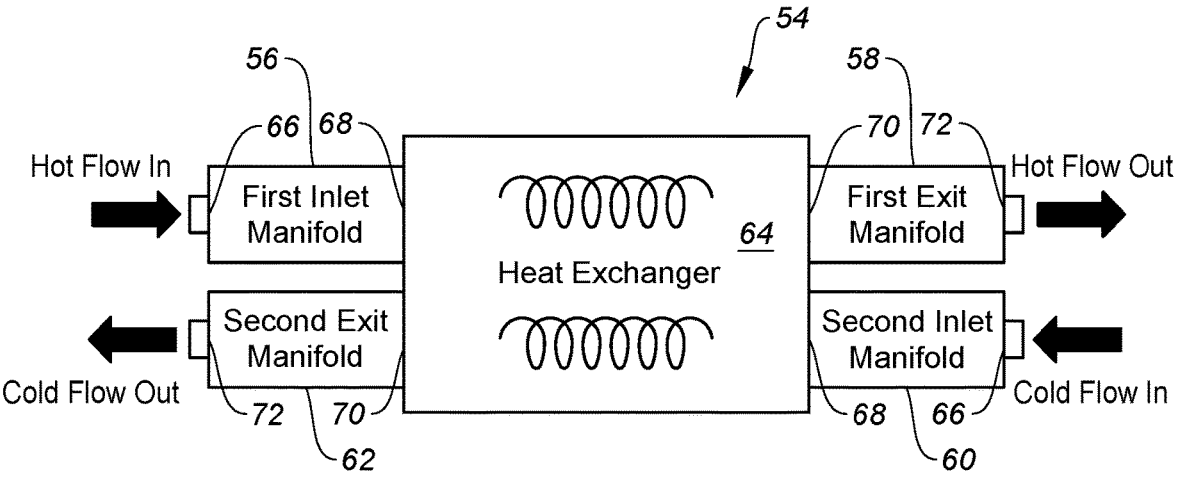
FIG. 2 is a diagrammatic view of a cross-flow heat exchanger.

FIG. 2 diagrammatically illustrates a crossflow heat exchanger 54 that includes a first inlet manifold 56, a first exit manifold 58, a second inlet manifold 60, a second exit manifold 62, and a heat exchanger core 64. The inlet manifolds 56, 60 include at least one fluid inlet 66 and a fluid outlet 68 that is configured to distribute working fluid into the heat exchanger core 64. The exit manifolds 58, 62 include a fluid inlet 70 configured to collect working fluid from the heat exchanger core 64 and at least one fluid exit 72. The inlet and exit manifolds 56, 58, 60, 62 may be rigidly attached to the heat exchanger core 64 or structure housing or supporting the heat exchanger core 64.

A first working fluid following a first fluid flow path through the heat exchanger 54 enters the first inlet manifold 56, passes through the heat exchanger core 64, and enters and exits the first exit manifold 58. A second working fluid following a second fluid flow path through the heat exchanger 54 enters the second inlet manifold 60, passes through the heat exchanger core 64, and enters and exits the second exit manifold 62.

As indicated above, during operation it is not uncommon for the heat exchanger core 64 temperature to differ from the inlet manifold temperature due to differences between the working fluids engaged with the heat exchanger 54. In particular, it is not uncommon for the heat exchanger core 64 temperature to vary as a function of time from the inlet manifold temperature. The changes in temperature will likely cause the materials of the heat exchanger 54 (each with their own heat transfer coefficient) to experience thermal expansion or contraction (collectively referred to herein as "thermal growth"). Moreover, the rate of thermal growth of the respective components is likely to differ. Because the inlet and exit manifolds 56, 59, 60, 62 are typically rigidly attached to one another, the differences in thermal growth and/or rate of thermal growth can induce undesirable stress in the respective heat exchanger 54 components.

To mitigate or avoid the undesirable stress in the respective heat exchanger 54 components, the present disclosure includes structure 74 (e.g., see FIGS. 3-7) within at least one of the inlet manifolds 56, 60 that is configured to produce turbulent flow within the respective inlet manifold 56, 60 to improve heat transfer between the working fluid passing through the inlet manifold 56, 60 and the inlet manifold 56, 60 itself. The improvement in heat transfer is understood to, in turn, decrease any differences in thermal growth and/or rate of thermal growth between the inlet manifold 56, 60 and the heat exchanger core 64 by, for example, adding vortex generator features that passively control manifold temperatures.

The diffusive characteristics of turbulent flow enhance heat transfer in general. In some embodiments (e.g., see FIGS. 3-7), the present disclosure structure 74 within the inlet manifold 56, 60 that is configured to produce turbulent flow may be more specifically configured to produce turbulent flow that inhibits the boundary layer formation and/or growth on inlet manifold 56, 60 surfaces. Boundary layers impede heat transfer between the working fluid and the surface on which the boundary layer is formed. Turbulent flow produced by embodiments of the present disclosure structure inhibits boundary layer development and consequently inhibits any thermally insulative effect that may be associated with the boundary layer.

In some embodiments, the present disclosure structure 74 within the inlet manifold 56, 60 that is configured to produce turbulent flow is more specifically configured to act as a vortex generator, one that sheds fluid vortices 76 (e.g., see FIGS. 3-5) downstream of the structure 74 disposed within the inlet manifold 56, 60. The vortex shedding is an oscillating flow that occurs when the working fluid flows passes a bluff body (e.g., structure 74, as opposed to a streamlined body) at certain velocities. The geometry of the bluff body 74 (e.g., size and shape) may be chosen based on characteristics of the working fluid (e.g., viscosity, density, or the like, or combinations thereof), the velocity of the fluid passing the bluff body 74, the geometry of the fluid flow path within inlet manifold 56, 60, and the like. The vortices 76 are created at the flow-wise back of the bluff body 74 and detach periodically from either side of the bluff body 74 forming a Kármán vortex street. The vortices forming the Kármán vortex street will dissipate over a distance.

Embodiments of the present disclosure inlet manifold 56, 60 may be configured with the bluff body 74 disposed proximate to the fluid inlet 66 of the inlet manifold 56, 60. The bluff body 74 may be disposed centrally relative to the fluid inlet 66 of the inlet manifold 56, 60, but is not required to be located centrally.

The bluff body 74 is spaced apart from the heat exchanger core 64 by a separation distance "L". The separation distance is chosen at least in part on a distance that is sufficient for the fluid vortices 76 to substantially dissipate before the fluid enters the heat exchanger core 64. The separation distance typically is chosen so that the fluid vortices 76 entirely (or almost entirely) dissipate before the fluid enters the heat exchanger core 64; i.e., the vortices 76 forming the Kármán vortex street will dissipate over a distance equal to or shorter than the separation distance. An example of an acceptable bluff body 74 separation distance can be shown using the diagrammatic view shown in FIG. 3. In this example, the bluff body 74 is cylindrical and has a diameter "d". The separation distance "L" between the center of the bluff body 74 and the entrance to the heat exchanger core 64 is in the range of fifteen to twenty-five bluff body diameters (L in the range of ~15d-25d). For most applications (e.g., fluid type, fluid velocity, and the like of a particular application), a separation distance of twenty bluff body diameters (20d) between the center of the bluff body 74 and the entrance to the heat exchanger core 64 will result in desirable dissipation of the flow vortices 76. As stated above, the separation distance is chosen to ensure that the fluid vortices 76 substantially dissipate before the fluid enters the heat exchanger core 64 and specific values for the separation distance may vary.

Figure 3:
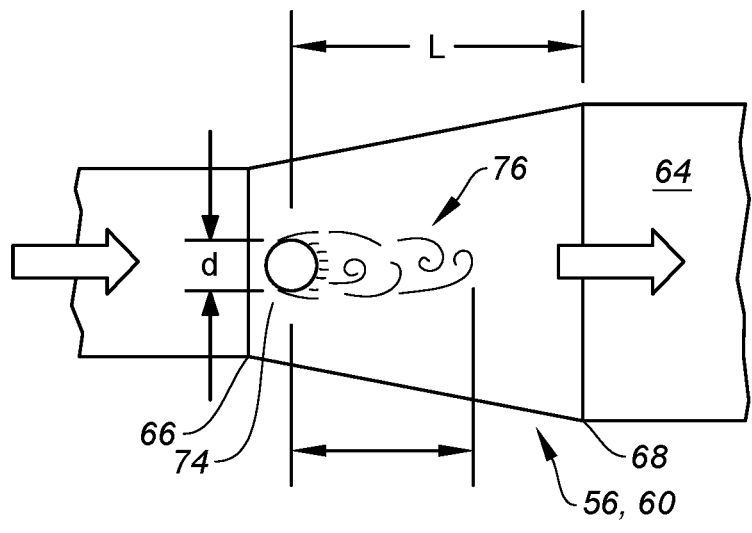
FIG. 3 is a diagrammatic view of a present disclosure inlet manifold example.
Figure 4:
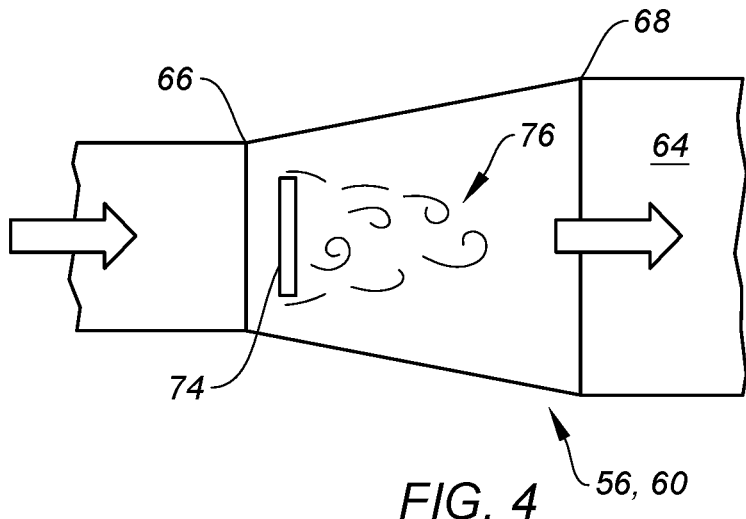
FIG. 4 is a diagrammatic view of a present disclosure inlet manifold example.
Figure 5:
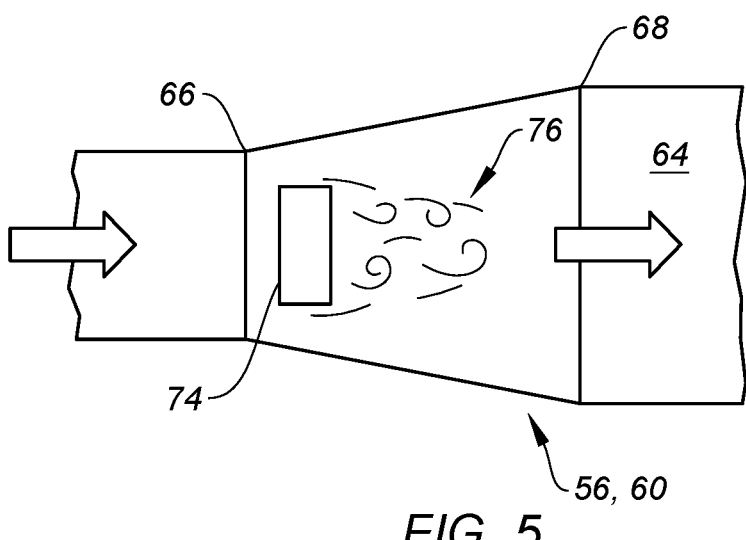
FIG. 5 is a diagrammatic view of a present disclosure inlet manifold example.
Figure 6:
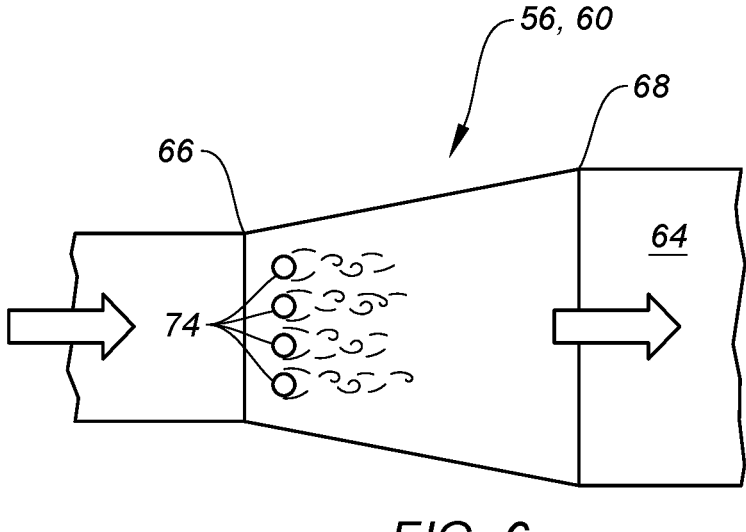
FIG. 6 is a diagrammatic view of a present disclosure inlet manifold example.
Figure 7:
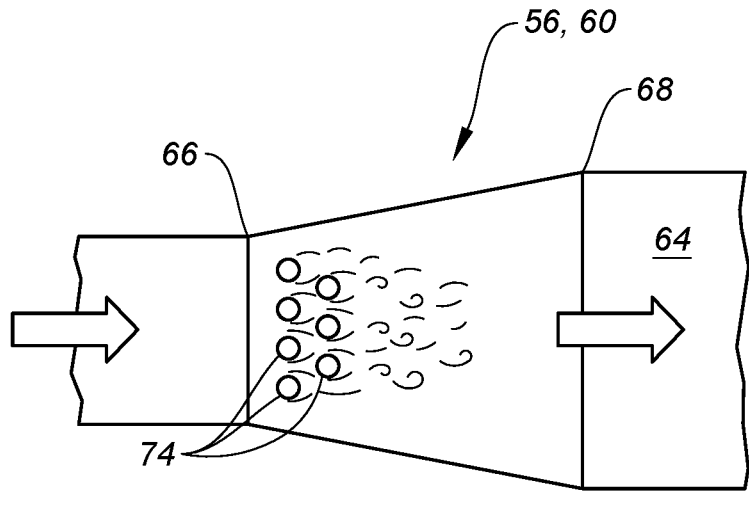
FIG. 7 is a diagrammatic view of a present disclosure inlet manifold example.

As stated above, the geometry of the bluff body 74 may be chosen based on several different parameters. In some embodiments, a single bluff body 74 may be utilized. FIGS. 3-5 diagrammatically illustrate single bluff body 74 examples; e.g., FIG. 3 diagrammatically illustrates a circular shaped bluff body 74, FIG. 4 diagrammatically illustrates a bluff body 74 having a plate configuration, and FIG. 5 diagrammatically illustrates a bluff body 74 having a box-like configuration. The bluff bodies 74 diagrammatically shown in FIGS. 3-5 are provided as non-limiting examples of bluff body 74 configurations that may be used and the present disclosure is not limited to these examples. FIGS. 6 and 7 diagrammatically illustrate non-limiting embodiments wherein more than one bluff body 74 may be used. FIG. 6 diagrammatically illustrates a single row of bluff bodies 74 and FIG. 7 diagrammatically illustrates two rows of bluff bodies 74. Here again, these multiple bluff body 74 configurations are provided to illustrate embodiments of the present disclosure and the present disclosure is not limited to these examples.

As indicated above, embodiments of the present disclosure are directed to a heat exchanger 54 that includes at least one inlet manifold 56, 60 and a heat exchanger core 64. In some embodiments, the heat exchanger 54 includes a plurality of inlet manifolds (e.g., 56, 60). The above described bluff body 74 configuration may be implemented in one of the inlet manifolds, or in a plurality (but not all) of inlet manifolds, or in all the inlet manifolds. Also as indicated above, an exit manifold 58, 62 may be included in some embodiments of the present disclosure heat exchanger 54. In those embodiments, one or more of the exit manifolds may include a bluff body 74 configuration as described above.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures--such as alternative materials, structures, configurations, methods, devices, and components, and so on--may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A heat exchanger, comprising:
   a heat exchanger core;
   an inlet manifold in fluid communication with the heat exchanger core, the inlet manifold having a fluid inlet and a fluid outlet; and
   a turbulence generating structure disposed adjacent to the fluid inlet of the inlet manifold, and a separation distance from the fluid outlet;

wherein the heat exchanger is configured with a fluid flow path through which a fluid flow enters the heat exchanger through the fluid inlet of the inlet manifold, encounters the turbulence generating structure and passes through the fluid outlet of the inlet manifold, and into the heat exchanger core;

wherein the turbulence generating structure is configured to produce turbulence in the fluid flow;

wherein the separation distance is long enough that the fluid flow entering the heat exchanger core is free of the turbulence resulting from the turbulence generating structure; and wherein the turbulence generating structure has a circular cross-section having a diameter, and the separation distance is in the range of fifteen to twenty-five times the diameter of the turbulence generating structure.

2. The heat exchanger of claim 1, wherein the turbulence generating structure disposed adjacent to the fluid inlet of the inlet manifold is a single structure.

3. The heat exchanger of claim 1, wherein the separation distance is twenty times the diameter of the turbulence generating structure.

4. The heat exchanger of claim 1, wherein the turbulence generating structure is a vortex generator configured to produce fluid vortices in the fluid flow aft of the turbulence generating structure, and the turbulence in the fluid flow includes the fluid vortices.

5. The heat exchanger of claim 4 wherein the turbulence generating structure configured to produce fluid vortices in the fluid flow aft of the vortex generator is configured to form said fluid vortices collectively as a Kárman vortex street.

6. The heat exchanger of claim 5, wherein the Kárman vortex street has a length extending between the turbulence generating structure and the fluid outlet of the inlet manifold, and the length of the Kárman vortex street is equal to or less than the separation distance.

7. The heat exchanger of claim 6, wherein the heat exchanger further includes an exit manifold, wherein the fluid flow path extends through the exit manifold.

8. The heat exchanger of claim 1, wherein the heat exchanger is configured as a cross flow heat exchanger;

wherein the fluid flow path is a first fluid flow path, wherein the fluid flow is a first fluid flow and the inlet manifold is a first inlet manifold, and the heat exchanger is configured such the first fluid flow enters the heat exchanger through the fluid inlet of the first inlet manifold, encounters the turbulence generating structure and passes through the fluid outlet of the first inlet manifold and into the heat exchanger core; and wherein the heat exchanger has a second fluid path for a second fluid flow, the second fluid path being orthogonal to the first fluid flow path.

9. A heat exchanger, comprising:

a heat exchanger core;

a first inlet manifold in fluid communication with the heat exchanger core, the first inlet manifold (FIM) having a FIM fluid inlet and a FIM fluid outlet;

a first turbulence generating structure disposed adjacent to the FIM fluid inlet of the first inlet manifold, and a first separation distance from the FIM fluid outlet; and a second inlet manifold in fluid communication with the heat exchanger core, the second inlet manifold (SIM) having a SIM fluid inlet and a SIM fluid outlet;

wherein the heat exchanger is configured with a first fluid flow path through which a first fluid flow enters the heat exchanger through the FIM fluid inlet, encounters the first turbulence generating structure and passes through the FIM fluid outlet, and into the heat exchanger core, wherein the first turbulence generating structure is configured to produce turbulence in the first fluid flow;

wherein the first separation distance is long enough such that the first fluid flow entering the heat exchanger core is free of the turbulence resulting from the first turbulence generating structure; and wherein the first turbulence generating structure has a circular cross-section having a diameter, and the first separation distance is in the range of fifteen to twenty-five times the diameter of the first turbulence generating structure.

10. The heat exchanger of claim 9, wherein the first turbulence generating structure is a vortex generator configured to produce fluid vortices in the first fluid flow aft of the first turbulence generating structure, and the turbulence in the first fluid flow includes the fluid vortices.

11. The heat exchanger of claim 10 wherein the first turbulence generating structure configured to produce fluid vortices in the first fluid flow aft of the vortex generator is configured to form said fluid vortices collectively as a Kárman vortex street.

12. The heat exchanger of claim 11, wherein the Kárman vortex street has a length extending between the first turbulence generating structure and the FIM fluid outlet of the first inlet manifold, and the length of the Kárman vortex street is equal to or less than the first separation distance.

13. The heat exchanger of claim 12, further comprising a first exit manifold (FEM) having a FEM fluid inlet and a FEM fluid outlet, wherein the first fluid flow path extends through the first exit manifold; and a second turbulence generating structure disposed adjacent to the SIM fluid inlet and a second separation distance from the SIM fluid outlet, wherein the second turbulence generating structure is a vortex generator configured to produce fluid vortices in the first fluid flow downstream of the second turbulence generating structure.

14. The heat exchanger of claim 12, further comprising a second turbulence generating structure disposed adjacent to the SIM fluid inlet and a second separation distance from the SIM fluid outlet;

wherein the heat exchanger is configured with a second fluid flow path through which a second fluid flow enters the heat exchanger through the SIM fluid inlet, encounters the second turbulence generating structure and passes through the SIM fluid outlet, and into the heat exchanger core, wherein the second turbulence generating structure is configured to produce turbulence in the second fluid flow; and wherein the second turbulence generating structure is a vortex generator configured to produce fluid vortices in the second fluid flow downstream of the second turbulence generating structure.

15. The heat exchanger of claim 14 wherein the second turbulence generating structure is configured to form said fluid vortices collectively as a second Kárman vortex street.

16. The heat exchanger of claim 15, wherein the second Kárman vortex street has a length extending between the second turbulence generating structure and the SIM fluid outlet, and the length of the second Kárman vortex street is equal to or less than the second separation distance.

17. The heat exchanger of claim 16, wherein the heat exchanger further includes a second exit manifold (SEM)

having a SEM fluid inlet and a SEM fluid outlet, wherein the second fluid flow path extends through the second exit manifold.

* * * * *